United States Patent [19]
Miki et al.

[11] 3,732,464
[45] May 8, 1973

[54] DISTANCE RELAY SYSTEM

[75] Inventors: Yoshiteru Miki; Hiroshi Sasaki, both of Hitachi; Masami Okamura, Musashino; Yoshifumi Oura, Yokohama, all of Japan

[73] Assignees: The Tokyo Electric Power Co., Chuyoka-ku; Tokyo Slubauria Electric Co., Ltd., Kawasaki-shi; Hitachi, Ltd., Chuyoda-ku, all of Japan; part interest to each

[22] Filed: Nov. 15, 1971

[21] Appl. No.: 198,787

[30] Foreign Application Priority Data

Nov. 19, 1970 Japan..........................45/102362

[52] U.S. Cl. .............................317/27 R, 317/36 D
[51] Int. Cl................................................H02h 3/28
[58] Field of Search.........................317/36 D, 27 R

[56] References Cited

UNITED STATES PATENTS

| | | | |
|---|---|---|---|
| 3,312,865 | 4/1967 | Gambale | 317/36 D |
| 3,369,156 | 2/1968 | Souillard | 317/36 D |

*Primary Examiner*—James D. Trammell
*Attorney*—Craig, Antonelli & Hill

[57] ABSTRACT

A back up protective relay system using a distance relay for protecting transmission lines from faults occurring thereon which system responds only to unsymmetrical faults that give rise to negative-sequence current, is provided. As the polarity voltage is used a voltage relevant to the faulted phase.

7 Claims, 24 Drawing Figures

INVENTORS
YOSHITERU MIKI, HIROSHI SASAKI,
MASAMI OKAMURA, YOSHIFUMI OURA
BY Craig, Antonelli & Hill
ATTORNEYS INVENTORS
YOSHITERU MIKI, HIROSHI SASAKI, MASAMI OKAMURA, YOSHIFUMI OURA
BY
Craig, Antonelli & Hill
ATTORNEYS

DISTANCE RELAY SYSTEM

BACKGROUND OF THE INVENTION

Field of the Invention

This invention relates to a distance relay system.

Description of the Prior Art

The object of the present invention is to provide a distance relay system and more particularly a distance relay system adapted especially for back up protection.

Briefly speaking, a distance relay operates when it recognizes that the ratio of the voltage to the current which are both obtained from the transmission lines to be protected, i.e., the impedance from the location of the relay to the fault location, is within a certain range of values. In such an operation, the current is usually the one which includes a positive-sequence current component. Therefore, if there is a heavy load in the transmission line to be protected between the location of the relay installation and the limit of the protective region of the relay, such a load affects the operation of the relay. Namely, the impedance to be measured by the relay is small, if the load is heavy. Therefore, even if a fault occurs far beyond the limit of the protective region of the relay, the relay will respond to the fault. On the other hand, it may also happen that the relay fails in its operation in response to a fault if the load, the influence of which is previously taken into account, assumes a small value in time with the occurrence of the fault. For this reason, it has been desired to provide a protective relay system which is free from the influence of a load existing within the protective region.

SUMMARY OF THE INVENTION

The present invention has been made to attain the above described object and it is characterized in that the measurement of the distance by the relay is performed on the basis of the negative-sequence current component which is not affected by the current drawn to the load. As is well known to those skilled in the art, the negative-sequence current flows in a three-phase circuit only when unsymmetrical faults such as line-to-line faults, double line-to-ground faults and single line-to-ground faults occur on the circuit. Consequently, the load current has no influence upon the relay according to the invention. Moreover, the relay does not respond to a symmetrical three-phase fault such as a three-phase short-circuit. This is because the relay according to the invention aims to serve as a back up protective relay.

Further, the present invention is characterized by utilizing as the polarity voltage used for the detection of the distance a voltage relevant to the faulted phase.

DESCRIPTION OF THE PREFERRED EMBODIMENTS

Figure 1:
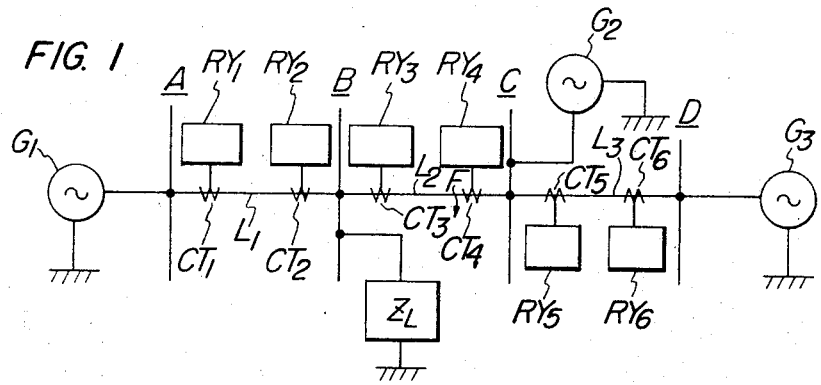
FIG. 1 is a single-line diagram of a power system for illustrating the necessity of the invention.

FIG. 1 is a single-line diagram of a power system which is illustrative of the necessity of the present invention. In this figure, transmission lines $L_1$, $L_2$, and $L_3$ are connected in series at electric stations B and C, and three-phase current sources $G_1$ and $G_3$ are connected at electric stations A and D with the transmission lines $L_1$ and $L_3$, respectively. In addition another three-phase current source $G_2$ is connected at the electric station C. These current sources have their neutrals grounded. At electric station B is connected a heavy load $Z_L$. It should be noted that any other current source and load may be connected at other electric stations according to the power system to be analyzed through a single-line diagram.

Generally, in order to protect this type of power system from faults, protective relays $RY_1$, $RY_2$, ....., $RY_6$ are used which are adapted to respond to the outputs of current transformers $CT_1$, $CT_2$, ....., $CT_6$ provided near the ends of the transmission lines.

For example, if there is caused a fault F at a part of the line $L_2$, the relays $RY_3$ and $RY_4$ will be energized to trip circuit breaker (not shown) associated with the line $L_2$ near the electric stations B and C for protective purpose.

Many varieties of relays or relay system may be used for such a protective relay scheme. The selection of the most suitable relay scheme is, however, made depending upon the type and capacity of power transmission. Further, for more important transmission lines a double stage protective device consisting of two similar or different relay systems may be used to make the protective operation unfailing. However, even in such a case where the most suitable device with double stage configuration is used, the completely unfailing response to every kind of fault is not possible. Therefore, the provision of a back up protective relay system is necessary to prevent an unexpected error in that the protective relay system happens to fail in responding to an actual fault.

A distance relay can generally be used as such a back up protective relay. The distance relay can detect the distance from the location where the relay is installed to the fault location. In this figure, for example, the back up protective relays installed near the stations A and D perform their function by detecting the distances from the location of the relay $RY_1$ to the fault location and from the location of the relay $RY_6$ to the fault location, respectively. If the back up protective relay at the station A is of the common type which operates by using the Δ-current and Δ-voltage at the location of the relay as its input, it can not detect the exact distance from the location thereof up to the fault location due to the influence by the load $Z_L$. Moreover, a certain type of load will make impossible the discrimination between the load as viewed from the distance relay and the actual fault so that the relay is caused to wrongly operate, thereby disrupting the proper distribution of power. Therefore, a distance relay in current use, which is driven by the Δ-current and the Δ-voltage, is not entirely satisfactory as a back up protective relay.

It is possible to exactly measure the distance from a reference location to a fault location even if there is such a load as that connected at the station B in FIG. 1. The way of exact measurement of distance will be clear from the following description.

Figure 2:
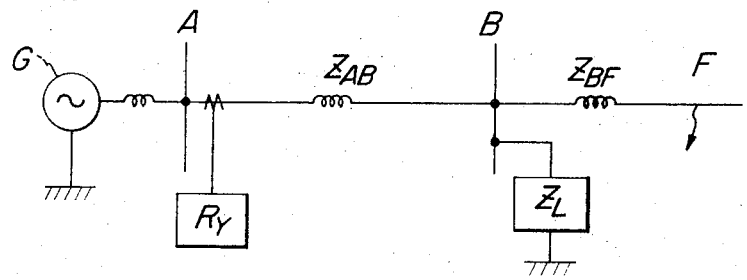
FIGS. 2 and 3 are respectively a single-line diagram and a three-phase circuit diagram for illustrating the second reserve protective operation.
Figure 3:
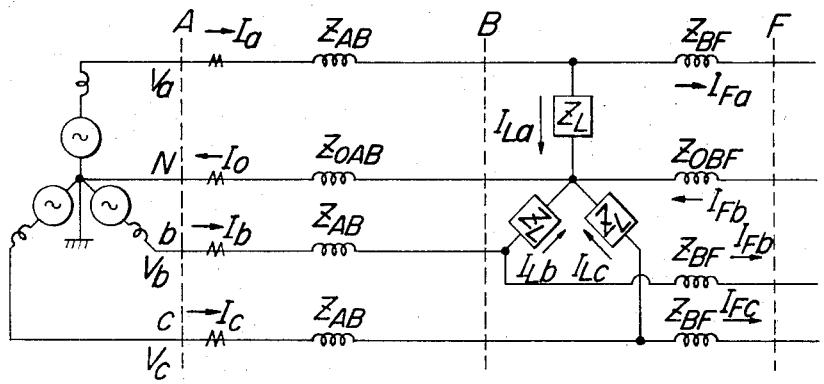

FIG. 2 shows a single-line diagram which is drawn by extracting only elements relevant to the back up protection out of the diagram of FIG. 1. In FIG. 2, $Z_{AB}$ indicates the impedance of the line $L_1$ from the station A to the station B and $Z_{BF}$ designates the impedance of the line $L_2$ from the station B to the fault location. A back up protective relay is indicated by a box labeled RY. FIG. 3 is the three-phase representation of the diagram in FIG. 2. The respective phase currents and the zero-sequence current at the location of the respective relays are denoted respectively by $I_a$, $I_b$, $I_c$ and $I_o$; the line-to-neutral or phase voltages at the location by $V_a$, $V_b$ and $V_c$; the currents flowing into the loads $Z_L$ from the respective lines by $I_{La}$, $I_{Lb}$ and $I_{Lc}$; and the phase currents and zero-sequence current flowing from the respective lines into the fault by $I_{Fa}$, $I_{Fb}$, $I_{Fc}$ and $I_{Fo}$. The character $Z_{oAB}$ indicates the equivalent impedance of the neutral line between the stations A and B while the character $Z_{oBF}$ designates the zero-sequence impedance of the neutral line between the station B and the fault location.

Now, consideration will be made of the protective relay associated with phase $a$ for example. Suppose first that a line-to-line fault, e.g. line-to-line short circuit (hereinafter referred to as $2\phi - S$) between, for example, phase $a$ and phase $b$ occurs. Then, the following relations can be obtained:

$$V_{ab} = Z_{AB}(I_a - I_b) + Z_{BF}(I_{Fa} - I_{Fb}) \quad (1),$$

$$Z_{BF}(I_{Fa} - I_{Fb}) = Z_L(I_{La} - I_{Lb}) \quad (2),$$

$$I_{La} + I_{Lb} + I_{Lc} = 0 \quad (3),$$

$$I_a + I_b + I_c = 0 \quad (4),$$

$$I_a = I_{Fa} + I_{La} \quad (5),$$

$$I_b = I_{Fb} + I_{Lb} \quad (6),$$

$$I_c = I_{Lc} \quad (7),$$

$$I_{La} = V_a - Z_{AB}I_a/Z_L \quad (8),$$

$$I_{Lb} = V_b - Z_{AB}I_b/Z_L \quad (9),$$

and $$I_{Lc} = V_c - Z_{AB}I_c/Z_L = I_c \quad (10).$$

Further, it follows from the above expressions (1) to (10) that $$Z_{BF} = \frac{V_{ab}}{I_a - I_b} - Z_{AB} \cdot \frac{V_c - Z_{AB}I_c}{V_c - \frac{V_{ab}}{I_a - I_b} \cdot I_c} \quad (11)$$

Suppose secondly that a double line-to-ground fault (hereinafter referred to as $2\phi - G$), e.g. phase $a$ and phase $b$ being grounded, occurs. Then, in like manner the following relations are derived:

$$V_{ab} = Z_{AB}(I_a - I_b) + Z_{BF}(I_{Fa} - I_{Fb}) \quad (12),$$

$$Z_L(I_{La} - I_{Lb}) = Z_{BF}(I_{Fa} - I_{Fb}) \quad (13),$$

$$I_a = I_{La} + I_{Fa} \quad (14),$$

$$I_b = I_{Lb} + I_{Fb} \quad (15),$$

$$I_c = I_{Lc} \quad (16),$$

$$I_o = I_a + I_b + I_c \quad (17),$$

and $$V_c = (Z_{AB} + Z_L)I_c + Z_{oAB}I_o \quad (18).$$

And it follows from the expressions (12) to (18) that $$Z_{BF} = \frac{V_{ab}}{I_a - I_b} - Z_{AB} \cdot \frac{V_c - Z_{AB}I_c - Z_{oAB}I_o}{V_c - \frac{V_{ab}}{I_a - I_b} I_c - Z_{oAB}I_o} \quad (19)$$

In the expressions (11) and (19), the quantities $V_{ab}$, $V_c$, $I_a$, $I_b$, $I_c$ and $I_o$ are all measurable at the location where the relay is installed and $Z_{AB}$ and $Z_{oAB}$ are both known. Therefore, if a relay which operates in accordance with the expression (11) or (19), are to be constructed, then such a relay would exactly measure the distance without regard to the load $Z_L$.

Provided that $K_{2S}$ and $K_{2G}$ are introduced such that $$K_{2S} = \frac{V_c - Z_{AB}I_c}{V_c - \frac{V_{ab}}{I_a - I_b} I_c} \quad (20)$$

and $$K_{2G} = \frac{V_c - Z_{AB}I_c - Z_{oAB}I_o}{V_c - \frac{V_{ab}}{I_a - I_b} I_c - Z_{oAB}I_o} \quad (21)$$

then the relay characterized by the expression (11) or (19) are the same in principle as the conventional distance relay which responds to the Δ-current and Δ-voltage except for the compensation coefficients $K_{2S}$ and $K_{2G}$. Further, since in case of a short-circuit $I_o$ is zero, i.e., $I_o = 0$, $K_{2S}$ and $K_{2G}$ may be the same. Namely, in case of both $2\phi - S$ and $2\phi - G$, a conventional distance relay whose characteristic is compensated by a compensation coefficient $K_S$ such that $$K_s = \frac{V_c - Z_{AB}I_c - Z_{0AB}I_0}{V_c - \dfrac{V_{ab}}{I_a - I_b} I_c - Z_{0AB}I_0} \quad (22)$$

can be utilized for back up protection purposes.

Description will now be made of a distance relay for use in case of a single line-to-ground fault (hereinafter referred to as $1\phi - G$). Provided that in FIG. 3 one phase, say, phase $a$ is grounded. Then, the conditions at the fault are expressed by the following equations:

$$V_a = Z_{AB}I_a + Z_{BF}I_{Fa} + Z_{0AB}I_{Fo} + Z_{0AB}I_0 \quad (23),$$

$$Z_{BF}I_{Fa} + Z_{0BF}I_{Fo} = Z_L I_{La} \quad (24),$$

$$I_a = I_{La} + I_{Fa} \quad (25),$$

$$I_b = I_{Lb} \quad (26),$$

$$I_c = I_{Lc} \quad (27),$$

$$I_0 = I_a + I_b + I_c \quad (28),$$

and $$V_c = (Z_{AB} + Z_L)I_c + Z_{0AB}I_0 \quad (29).$$

From the relations (23) to (29) it follows that $$Z_{BF} + Z_{0BF} = \frac{V_a - Z_{0AB}I_0}{I_a}$$

$$- Z_{AB} \frac{V_c - Z_{AB}I_c - Z_{0AB}I_0}{V_c - \dfrac{V_a - Z_{0AB}I_0}{I_a} I_c - Z_{0AB}I_0} \quad (30)$$

Therefore, as described above, by introducing a compensation coefficient $K_{1G}$ such that $$K_{1G} = \frac{V_c - Z_{AB}I_c - Z_{0AB}I_0}{V_c - \dfrac{V_a - Z_{0AB}I_0}{I_a} I_c - Z_{0AB}I_0} \quad (31)$$

the conventional distance relay for use in case of a line-to-line short circuit fault can be used for back up protection. And the compensation coefficient $K_{1G}$ can be determined the voltages and currents at the location of the relay and other known constants.

Consequently, to take the compensation coefficients as in the expressions (22) and (31) into account enables the distance relay in current use, which is used to prevent the disorder of power system due to line-to-line and line-to-ground faults, to be used as a back up protective relay.

However, it is very difficult to establish an analogue circuit simulating such a compensation coefficient. And for this reason there is increasing demand for a digital computor to be utilized for the simulation of the coefficient.

The present invention has been made on the basis of the concept as clarified in the foregoing description. According to the invention, a distance relay scheme is provided which can be constructed as simply as the distance relay now in use by noting the fact that it is exclusively used for back up protection.

As is apparent from the previous description, current flowing in every part of a power system when a fault occurs at a part of the network consists not only of a current component directly ascribed to the fault but of a current component that flows through the load in accordance with the relative phase and magnitude of a voltage appearing at any part of the network just before the fault with respect to another. Consequently, if a relay of the conventional type is used, the compensation coefficients such as $K_S$ and $K_G$ must be taken into account. As is well known to those skilled in the art, the current component ascribed to the load due to voltage difference at any part of the network just before the fault, normally comprises a positive-sequence current with negligible negative-sequence current and zero-sequence current. Therefore, if the load component of a current is discussed, the positive-sequence current above should be taken into consideration while if the fault component of current is concerned there is a need for the examination of only the negative-sequence and zero-sequence currents.

Since the device according to the invention is just for the back-up protection, it is so designed as to respond only to unsymmetrical faults such as $2\phi - S$ and $2\phi - G$, or $1\phi - G$. In other words the device need not respond to symmetrical three-phase faults such as $3\phi - S$ and $3\phi - G$. For it would never happen that all the main or first actuated protective relays associated with the individual phases fail in their proper operation simultaneously.

The present invention contemplates only unsymmetrical faults where negative-sequence current or zero-sequence current necessarily flows. And the negative-sequence current and zero-sequence current due to a fault are independent of the load component of current, as described above. Accordingly, the present invention provides a relay which can measure the distance exactly although having a simple structure and which serves satisfactorily as a back up protective relay.

According to the invention, the impedance to be detected by the distance relay when a line-to-line fault between phases $a$ and $b$ or a double line-to-ground fault occurs, i.e., in case of $2\phi - S$ or $2\phi - G$, is set such that $$Z_{RY} = V_{RY}/I_{RY} = [(a^2 - A) V_{ab}]/a^2 I_a + a I_b + I_c \quad (32),$$

where $a$ is the well known operator defined by the expressions $a = 1 \angle 120° = 1e^{j2\pi/3} = -\frac{1}{2} + j(\sqrt{3}/2)$. Namely, the input current to the relay is the negative-sequence current relative to the phase free from the fault as a reference while the input voltage is the voltage having an amplitude equal to the line-to-line voltage between the faulted phases $a$ and $b$ but having a phase lagging by 90° behind the phase of the line-to-line voltage. The distance relay of the invention will be energized when the ratio $V_{RY}/I_{RY}$ is within a predetermined range of values. In the following is given explanation of how the relay responds to various faults.

1. Three-phase fault $3\phi - S$ or $3\phi - G$ and no fault $V_{RY} = (a^2 - a)V_{ab} = \sqrt{3} V_{ab} \angle -90° \neq 0$ $I_{RY} = (a^2 I_a + a I_b + I_c) = 3I_2 \approx 0$ Since the denominator of the quotient is near zero with the numerator inequal to zero, the ratio $V_{RY}/I_{RY}$, i.e., the impedance $Z_{RY}$ becomes quasi-infinite. Therefore, the relay will never operate.

2. Internal Fault $2\phi - S$ a. Short-circuit between phases $a$ and $b$ $Z_{RY} = (a^2 - a) \cdot V_{ab}/a^2 I_a + a I_b + I_c = (a^2 - a)(V_a - V_b)/3_2$ $$= (a^2 - a)(V_o + a^2 V_1 + aV_2 - V_o - aV_1 - a2V_2)/3I_2$$
$$= (a^2 - a)^2 (V_1 - V_2)/3I_2 = V_2 - V_1/I_2 \quad (33)$$

Figure 4:
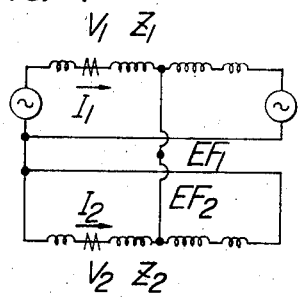
FIG. 4 is an equivalent circuit for a line-to-line fault.

From the equivalent connection diagram in FIG. 4 for the line-to-line fault in question, it follows that $$\begin{cases} V_2 = Z_2 I_2 + EF_2 \\ V_1 = Z_1 I_1 + EF_1 \end{cases} \quad (34),$$

where $EF_1 = EF_2$ (voltages at the fault location), $I_1 \approx -I_2$ ($I_1$: positive-sequence current) and $Z_1 \approx Z_2$ ($Z_1$: positive-sequence impedance, $Z_2$: negative-sequence impedance).

Thus,
$$Z_{RY} = (Z_2 I_2 + EF_2) - (Z_1 I_1 + EF_2)/I_2$$
$$= Z_2 I_2 - Z_1 I_1 / I_2$$
$$= Z_2 - Z_1 (I_1/I_2) \approx Z_2 + Z_1 = 2Z_1.$$

Figure 5:
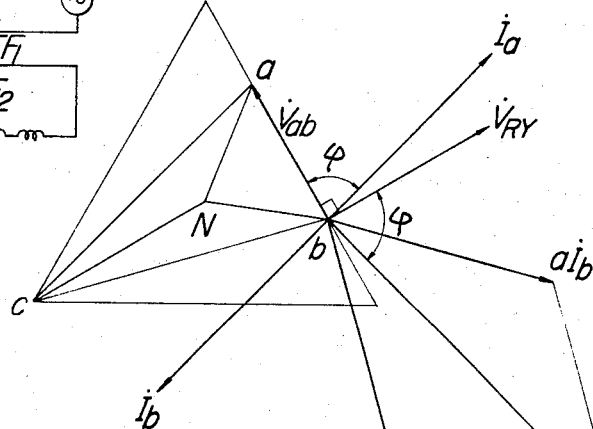
FIGS. 5 to 7 are vector diagrams for illustrating the responses of the relay for two phases according to the invention to line-to-line faults.

The impedance $Z_{RY}$ is approximately equal to the impedance of the transmission line from the location of the relay to the fault location so that the relay is to properly operate. FIG. 5 shows vectorical relations between the relevant voltages and currents. The impedance angle of the transmission line is designated at $\phi$. As is apparent from FIG. 5, the relay for phases $a$ and $b$, i.e., the phase $a - b$ relay (hereinafter such notation is adopted), can operate with the maximum sensitivity since there is a phase difference equal to the characteristic angle $\phi$ between the input voltage $V_{RY}$ and the input current $I_{RY}$ to the relay when there is a phase $a - b$ fault.

b. Short-circuit between phases $b$ and $c$ $$Z_{RY} = (a^2 - a)V_{ab}/a^2 I_a + aI_b + I_c = (1 - a^2)V_{ab}/I_a + a^2 I_b + aI_c$$
$$= (1 - a^2)(V_o + V_1 + V_2 - V_o - a^2 V_1 - aV_2)/3I_2$$
$$= (1 - a^2)[(1 - a)^2 V_1 + (1\ 31 - a)V_2]/3I_2$$
$$= (1 - a^2)^2 V_1 + (1 - a^2)(1 - a)V_2 13 I_2$$
$$= -a^2 V_1 + V_2/I_2$$
$$= -a^2 (I_1 Z_1 + EF_1) + (I_2 Z_2 + EF_2)/I_2$$
$$= -a^2 (-I_2 Z_1 + EF_1) + (I_2 Z_1 + EF_1)/I_2$$
$$= Z_1 I_2 (1 + a^2) + EF_1 (1 - a^2)/I^2$$
$$= -aZ_1 + (1 - a^2)(EF_1/I_2)$$

So, the impedance $Z_{RY}$ can not be independent of the voltage $EF_1$ at the fault location. Also, the impedance $Z_{RY}$ has a phase lag of 120° behind the impedance $Z_1$. Namely, the phase $a - b$ relay regards the phase $b - c$ fault as if it occurred in a direction behind the relay. And the relay does not operate for short-circuit between phases $b$ and $c$.

Figure 6:
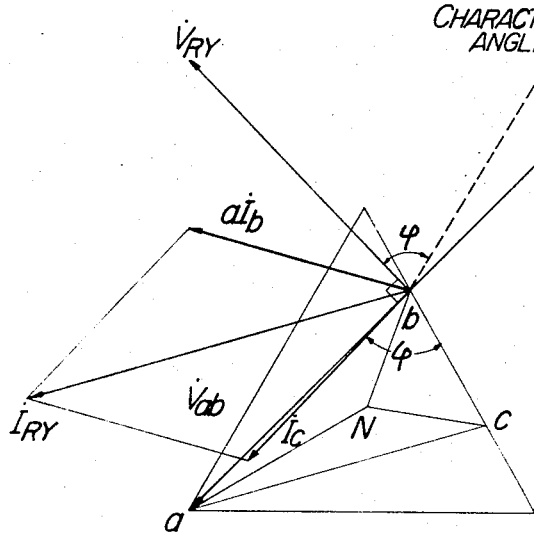

The vector diagram of the relevant voltages and currents is shown in FIG. 6. The input current $I_{RY}$ to the relay, as apparent from FIG. 6, has a phase difference of more than 90° with respect to the characteristic angle so that the relay can never be operated.

c. Short-circuit between phases $c$ and $a$ $$Z_{RY} = (a^2 - a) V_{ab}/a^2 I_a + aI_b + I_c = (a - 1) V_{ab}/aI_a + I_b + a^2 I_c$$
$$= (a - 1)(V_o + aV_1 + a^2 V_2 - V_o - V_1 - V_2)/3I_2$$
$$= (a - 1)[(a - 1)V_1 + (a^2 - 1)V_2]/3I_2$$
$$= (a - 1)^2 V_1 + (a - 1)(a^2 - 1)V_2/3I_2$$
$$= -aV_1 + V_2/I_2 = -a(-I_2 Z_1 - EF_1) + (I_2 Z_1 + EF_1)/I_2$$
$$= -a^2 Z_1 - (a - 1)(EF_1/I_2)$$

Figure 7:
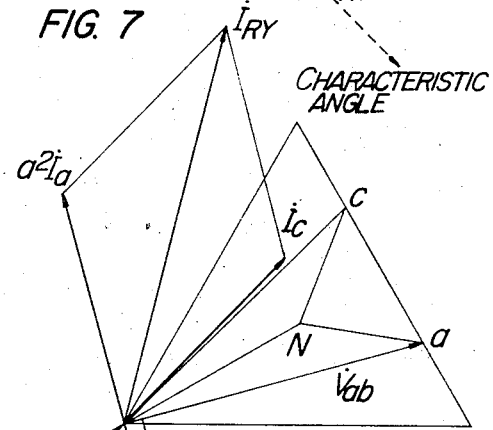

Also, in this case, $Z_{RY}$ includes $EF_1$ and the same result is obtained as in the last topic. The phase $a - b$ relay does not misoperate. The vector diagram concerned is shown in FIG. 7.

3. Internal Fault $2\phi - G$

The double line-to-ground fault presents almost the same result as in the line-to-line fault, i.e., $2\phi - S$. Description will be made below in connection with the associated vector diagrams.

a. Phases $a$ and $b$ grounded

Figure 8:
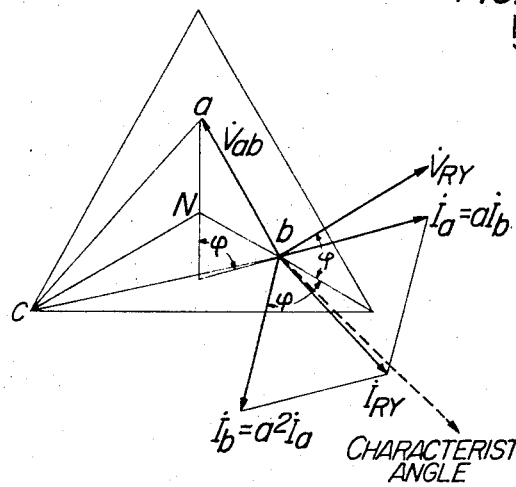
FIGS. 8 to 13 are vector diagrams for illustrating the responses of the relay for two phases according to the invention to double line-to-ground faults and single line-to-ground faults.

The vector diagram is shown in FIG. 8. In comparison with the vector diagram in FIG. 5 which corresponds to the line-to-line fault, it is seen that the input current $I_{RY}$ to the relay is slightly deviated from the characteristic angle $\phi$. Consequently, the relay operates accurately.

b. Phases $b - c$ grounded
c. Phases $c - a$ grounded

Figure 9:
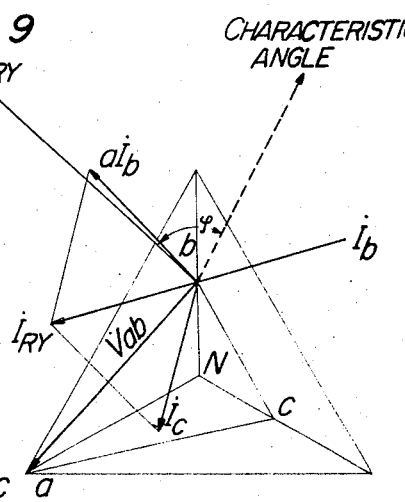
Figure 10:
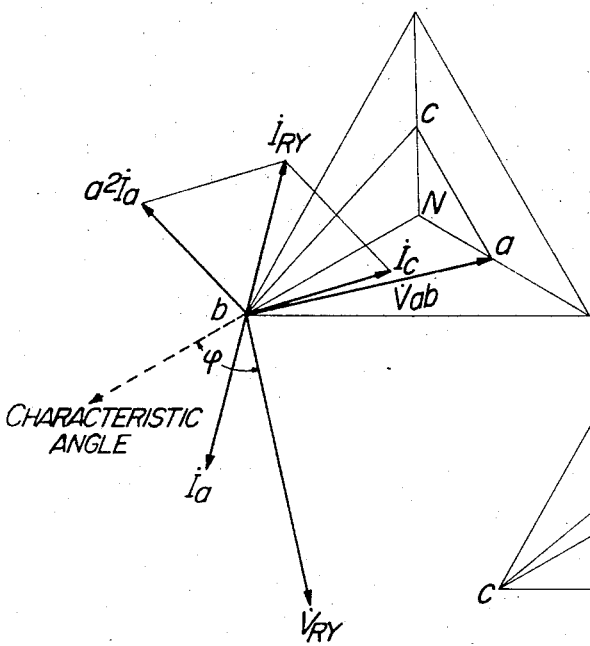

The vector diagrams of these two cases are shown respectively in FIGS. 9 and 10. The comparison of these diagrams with those shown in FIGS. 6 and 7 indicates that the relay does not operate in these cases.

4. Internal Fault $1\phi - G$

The vector diagram shows that the line-to-ground fault, no matter which phase $a$, $b$ or $c$ has a fault, cannot cause the phase $a - b$ relay to operate.

Figure 11:
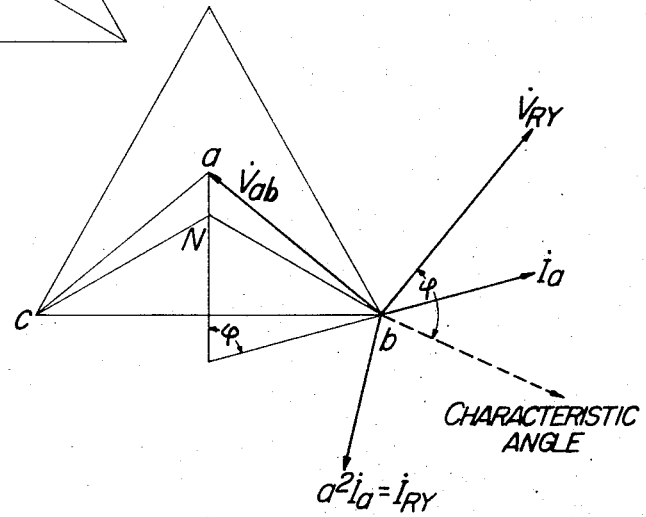
Figure 12:
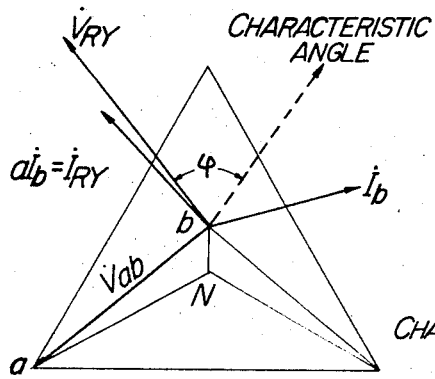
Figure 13:
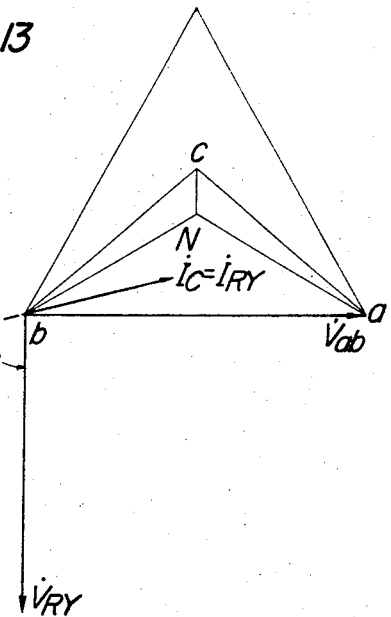
Figure 14:
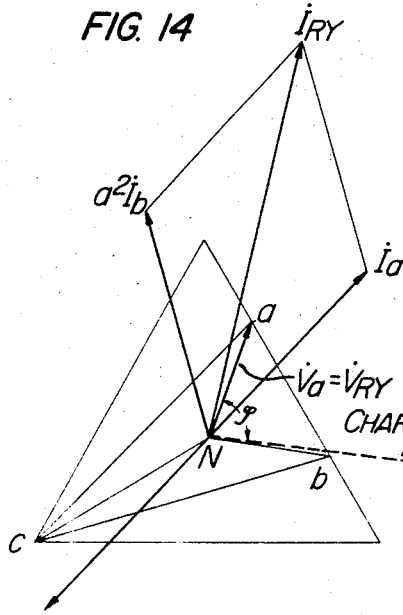
FIGS. 14 to 19 are vector diagrams for illustrating the responses of the relay for a single phase according to the invention to line-to-line faults and double line-to-ground faults.
Figure 15:
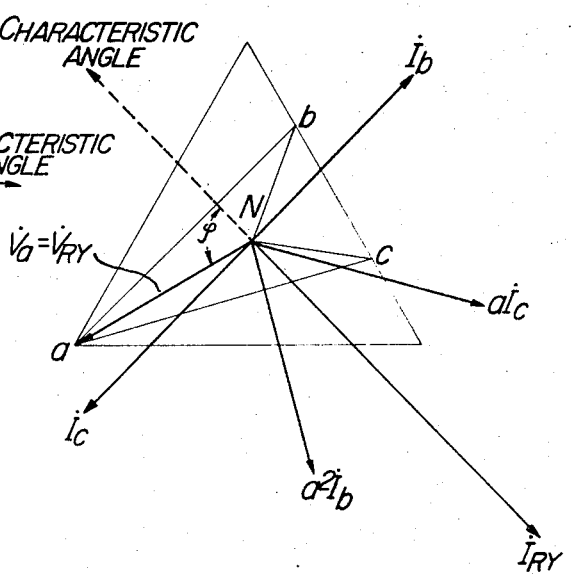
Figure 16:
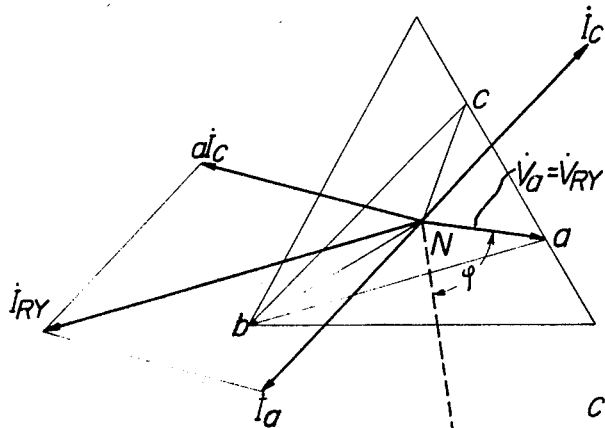
Figure 17:
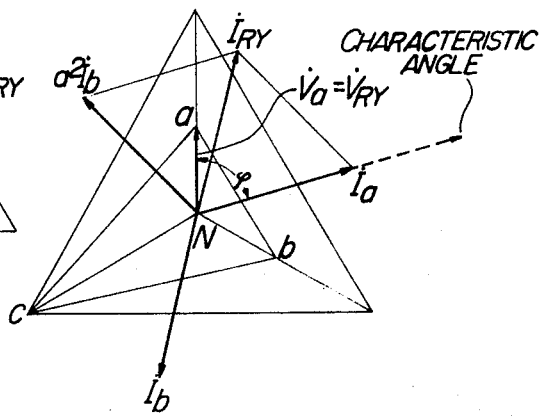
Figure 18:
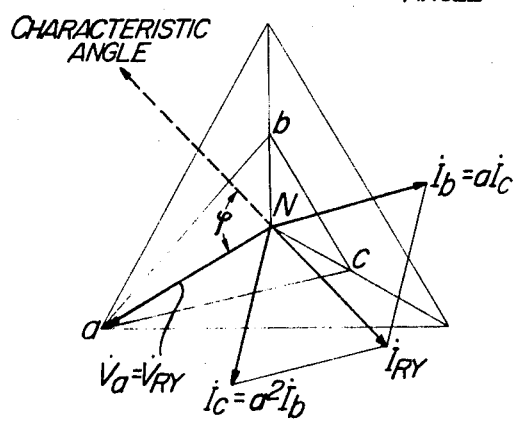
Figure 19:
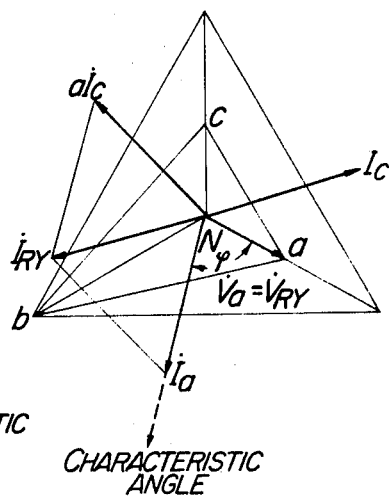

FIGS. 11, 12 and 13 show the vector diagrams corresponding to line-to-ground faults respectively with phases $a$, $b$ and $c$ grounded. In each of these three cases, the input current $I_{RY}$ has a phase difference of more than about 90° with respect to the characteristic angle $\phi$. Therefore, the back up protective relay for two phases, i.e., the phase $a - b$ relay taken for example in the preceding description, can never operate in case of a line-to-ground fault.

Next, description will be made of a protective relay, i.e., distance ground relay, for a single phase. The impedance measured by the distance relay with respect to phase $a$ is set such that $$Z_{RY} = V_{RY}/I_{RY} = V_a/I_a + a^2 I_b + aI_c$$

Namely, the input current is the negative-sequence component with respect to the grounded phase taken as a reference while the input voltage is the phase voltage of the faulted phase. The relay is so designed as to operate when the impedance assumes a value within a predetermined range. The actual operations of the relay for various faults are described below.

1. Three-phase faults $3\phi - S$ and $3\phi - G$ and no fault
$V_{RY} \approx 0, I_{RY} \approx 3I_2 \approx 0$ Therefore, the impedance $Z_{RY}$ is quasi-infinite so that the relay can never operate.

2. $2\phi - S$ and $2\phi - G$

FIGS. 14 to 16 and FIGS. 17 to 19 show the vector diagrams corresponding to the faults $2\phi - S$ and $2\phi - G$, respectively. In particular, FIG. 14 corresponds to short-circuit between phases $a$ and $b$, FIG. 15 to short-circuit between phases $b$ and $c$, and FIG. 16 to short-circuit between phases $c$ and $a$; and FIG. 17 corresponds to the fault where phases $a$ and $b$ are grounded, FIG. 18 to the fault with phases $b$ and $c$ grounded, and FIG. 19 to the fault with phases $c$ and $a$ grounded. In each case the input current $I_{RY}$ to the relay has a phase difference of more than about 90° with respect to the orientation of the characteristic angle. Therefore, the distance ground relay can not operate for such faults as $2\phi - S$ and $2\phi - G$.

3. $1\phi - G$

The response of the relay to this signal line-to-ground fault is similar to those made to the faults described above.

Figure 20:
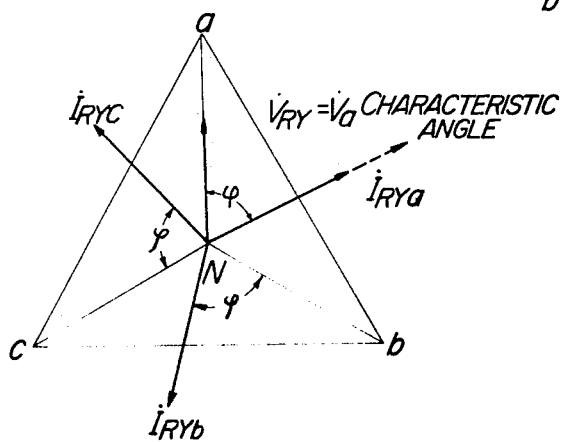
FIG. 20 is a vector diagram for illustrating the responses of the relay for a single phase according to the invention to single line-to-ground faults.

FIG. 20 is the vector diagram which shows the relations between the voltages and currents of single line-to-ground faults occurring on phases a, b and c of three-phase circuit. In FIG. 20, the input currents to the relay corresponding to the faults with phases a, b and c grounded are indicated respectively by $I_{RYa}$, $I_{RYb}$ and $I_{RYc}$. As is apparent from FIG. 20, the phase of the input current is coincident with the characteristic angle only when phase a is the one on which the fault occurs. And at such a fault alone the relay operates.

Figure 21:
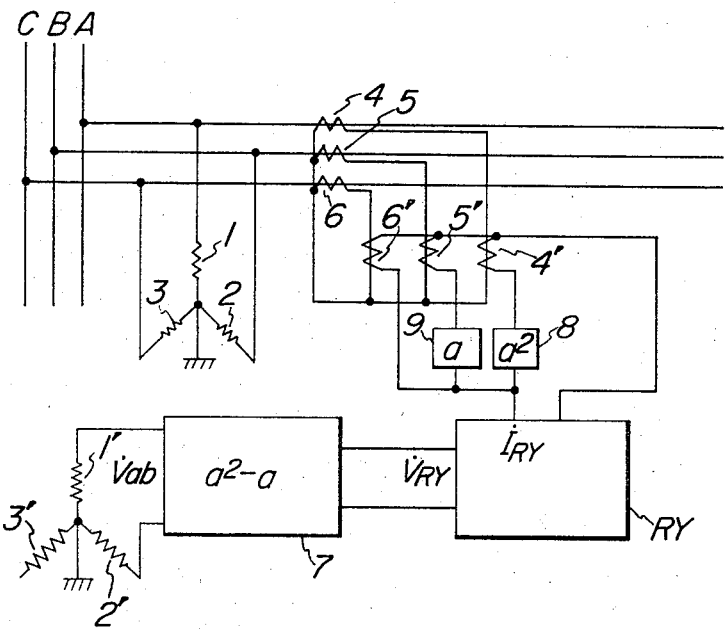
FIGS. 21 and 22 show a block diagrams of input circuits for the relays according to the invention.
Figure 22:
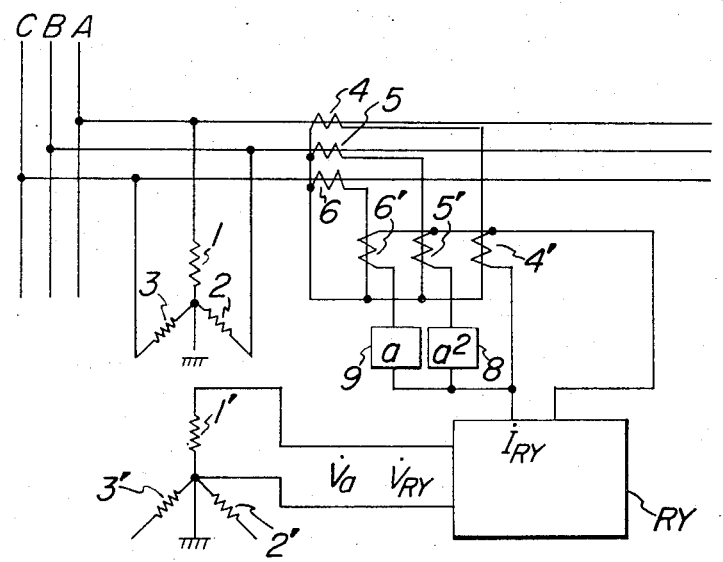
Figure 23:
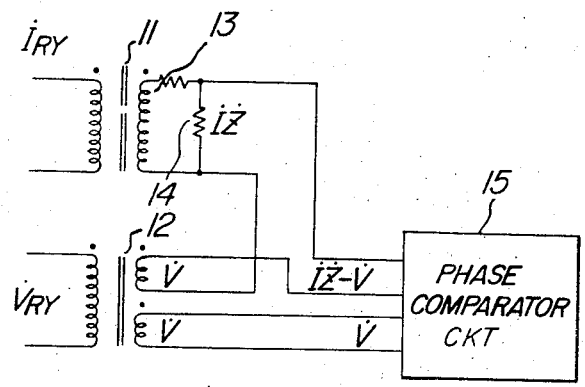
FIGS. 23 and 24 show the circuit of a relay as one embodiment of the invention and an impedance diagram for illustrating the characteristic of the relay circuit, respectively.

FIG. 21 shows an input circuit of a distance relay for phases a and b which is adapted for two phase faults such as $2\phi - S$ and $2\phi - G$, while FIG. 22 shows an input circuit of a distance relay for phase a which is adapted for single phase fault such as $1\phi - G$. In FIGS. 21 and 22, the respective phases of a three-phase circuit are designated at capital letters A, B and C, the phase voltages and phase currents mentioned above being provided with the corresponding small letter suffixes a, b and c. Numerals 1, 2, 3 and 1', 2', 3' indicate the primary and secondary windings of a voltage transformer PT respectively; 4, 5, 6 and 4', 5', 6' current transformers and auxiliary current transformers respectively; and 7, 8 and 9 phase shifting circuits. The phase shifting circuit 7 is characterized by an operator $a^2 - a$ and is adapted to cause the phase of an input signal to lag 90° behind. The phase shifting circuit 8 with an operator $a^2$ provides a lead in phase of 240°. The circuit 9 corresponds to an operator $a$ which provides a 120° lead in phase for a signal passing therethrough. Character RY indicates a relay whose exemplary circuit is shown in FIG. 23. It is apparent from FIG. 21 that the input voltage $V_{RY}$ to the distance relay for two phase faults is expressed as $(a^2 - a)V_{ab}$ while the corresponding input current $I_{RY}$ is given by the expression $a^2 I_a + aI_b + I_c$. Also, it is seen from FIG. 22 that in case of the distance relay for a single phase fault the input current $I_{RY}$ to the relay is equal to $V_a$ while the corresponding input current $I_{RY}$ is equal to $I_a + a^2 I_b + aI_c$. In each case, the input voltage is the one which involves the faulted phase and the input current is of negative-sequence.

Figure 24:
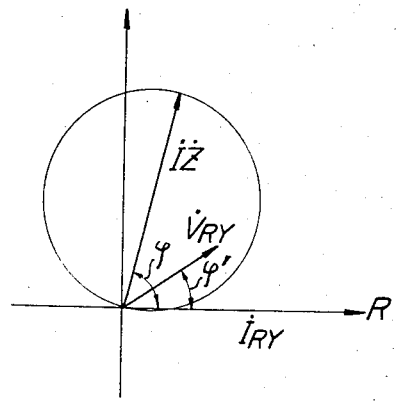

FIG. 23 is an electrical connection diagram of one embodiment of a relay according to the invention, in which numeral 11 indicates a current transformer which a gapped core that receives $I_{RY}$ as input and numeral 12 denotes an insulation transformer whose input is $V_{RY}$. Resistors 13 and 14 are connected with the secondary winding of the gapped-core transformer 11. And across the resistor 14 is developed a voltage IZ having a lead in phase equal to the characteristic angle $\phi$ with respect to the input current $I_{RY}$. The impedance Z is none other than the one that should be detached by the relay concerned. One of the secondary windings of the transformer 12 is connected in opposite polarity with the voltage IZ and further with a phase comparator circuit 15. The other of the secondary windings of the transformer 12 is directly connected with the phase comparator circuit 15. The phase comparator circuit 15 operates if the phase difference between the two input signals IZ-V and V is less than 90° and the circuit 15 exhibits its most sensitive operation when the two input signals are in phase with each other. Namely, the circuit shown in FIG. 23 is the widely used one, which is so designed as to satisfy the mho characteristic shown in FIG. 24. Inspection of the mho characteristic and the vector diagrams in the preceding figures will lead to a conclusion that if the input current $I_{RY}$ to the relay has a phase difference of more than about 90° the relay will not operate regardless of whether the distance (impedance) to be measured is large or small.

We claim:

1. A distance relay system, having a distance relay, for use in a three phase electric power system comprising:
   first means for deriving from said power system a voltage having an amplitude and a phase respectively in proportion to and lagging by 90° behind the amplitude and phase of a line-to-line voltage; and
   second means for deriving from said power system a current having an amplitude and a phase respectively in proportion to and equal to the amplitude and phase of a negative-sequence current relative to the remaining phase free from the protection taken as a reference, whereby the impedance from the location of said relay to the fault location is derived from the ratio of said voltage and current respectively derived by the first and second means so as to protect the electric power system.

2. A distance relay system according to claim 1, in which said impedance is determined by a phase comparator circuit which compares the phase of a factor IZ-V for distance measurement with the phase of a polarity voltage V, where V is the voltage derived by said first means, I is the current derived by said second means, and Z is a setting impedance.

3. A distance relay system, having a distance relay, for use in a three phase electric power system comprising:
   first means for deriving a voltage having an amplitude and a phase respectively in proportion to and equal to the amplitude and the phase of a line-to-ground voltage of the phase chosen as the subject to the protection; and
   second means for deriving a current having an amplitude and a phase respectively in proportion to and equal to the amplitude and phase of a negative-sequence current relative to said phase chosen as the subject to the protection and taken as a reference; whereby an impedance from the location of said relay to the fault location is derived from the ratio of said voltage and current respectively derived by the first and second means so as to protect the electric power system.

4. A distance relay system according to claim 3, in which said impedance is determined by a phase comparator circuit which compares the phase of a factor IZ-V for distance measurement with the phase of a polarity voltage V, where V is the voltage derived by said first means, I is the current derived by said second means, and Z is a setting impedance.

5. A distance relay system for use in a three phase electric power system comprising
   a three phase voltage transformer having primary windings connected to the respective phase lines of said power system and corresponding secondary windings inductively coupled to said primary windings,
   a three phase current transformer having three windings coupled to the respective phase lines of said power system, a first phase shifter providing a leading phase shift of 120° connected to one of the windings of said current transformer,
a second phase shifter providing a leading phase shift of 240° connected to a second winding of said current transformer, and
a distance relay connected to the secondary windings of said voltage transformer to obtain a voltage signal and connected to said current transformer windings through said first and second phase shifters to obtain a current signal so as to provide an impedance indication based on said voltage and current signals.

6. A distance relay system as defined in claim 5 wherein said distance relay includes a phase comparator circuit, relay transformer means responsive to said current and voltage signals for providing a phase signal IZ-V for distance measurement with the phase of the voltage signal, where X is a setting impedance, said comparator circuit being connected to said relay transformer means so as to be responsive to said phase signal and said voltage signal.

7. A distance relay system as defined in claim 5 further including a third phase shifter connected to the secondary windings of said voltage transformer providing a lagging phase shift of 90° to the voltage signal applied to said distance relay.

* * * * *